United States Patent
Dentith, Jr.

(10) Patent No.: US 12,134,278 B2
(45) Date of Patent: Nov. 5, 2024

(54) MARKING SYSTEM FOR MOLDABLE SUBSTRATES

(71) Applicant: Crayola LLC, Easton, PA (US)

(72) Inventor: Robert R. Dentith, Jr., Bangor, PA (US)

(73) Assignee: Crayola LLC, Easton, PA (US)

( * ) Notice: Subject to any disclaimer, the term of this patent is extended or adjusted under 35 U.S.C. 154(b) by 217 days.

(21) Appl. No.: 17/843,449

(22) Filed: Jun. 17, 2022

(65) Prior Publication Data

US 2022/0314675 A1 Oct. 6, 2022

Related U.S. Application Data

(62) Division of application No. 16/445,959, filed on Jun. 19, 2019, now Pat. No. 11,396,197.

(51) Int. Cl.
| | |
|---|---|
| *B41M 3/00* | (2006.01) |
| *A63H 33/00* | (2006.01) |
| *B44C 3/04* | (2006.01) |
| *C04B 33/14* | (2006.01) |
| *C09D 5/29* | (2006.01) |
| *C09D 11/50* | (2014.01) |
| *C04B 33/13* | (2006.01) |

(52) U.S. Cl.
CPC ........... *B41M 3/001* (2013.01); *A63H 33/001* (2013.01); *B44C 3/04* (2013.01); *C04B 33/14* (2013.01); *C09D 5/29* (2013.01); *C09D 11/50* (2013.01); *C04B 33/1305* (2013.01)

(58) Field of Classification Search
CPC ........ B41M 3/001; A63H 33/001; B44C 3/04; C09D 11/50
See application file for complete search history.

(56) References Cited

U.S. PATENT DOCUMENTS

| | | | |
|---|---|---|---|
| 4,682,612 A * | 7/1987 | Giuliano | ................ A45D 31/00 132/73 |
| 5,171,766 A | 12/1992 | Mariano et al. | |
| 5,364,892 A | 11/1994 | Miller et al. | |
| 5,498,645 A | 3/1996 | Mariano et al. | |
| 5,506,280 A | 4/1996 | Miller et al. | |
| 6,124,377 A | 9/2000 | Kaiser et al. | |
| 6,359,057 B1 | 3/2002 | Li | |
| 7,727,319 B2 | 6/2010 | Li et al. | |
| 7,815,723 B2 | 10/2010 | Li et al. | |
| 9,464,185 B2 | 10/2016 | Pineiro et al. | |
| 9,790,383 B2 | 10/2017 | Pineiro et al. | |
| 9,822,274 B2 | 11/2017 | Smith | |
| 10,138,358 B2 | 11/2018 | Nguyen et al. | |
| 2013/0178362 A1 | 7/2013 | Stovold et al. | |
| 2019/0016877 A1 | 1/2019 | Moskal et al. | |
| 2019/0016912 A1 | 1/2019 | Allison et al. | |

OTHER PUBLICATIONS

Entire patent prosecution history of U.S. Appl. No. 16/445,959, filed Jun. 19, 2019, entitled, "Marking System for Moldable Substrates." Inventor: Dentith, Robert.

* cited by examiner

*Primary Examiner* — Gerard Higgins

(74) *Attorney, Agent, or Firm* — Buchanan Ingersoll & Rooney PC

(57) ABSTRACT

A marking system includes a composition having at least one color precursor, a moldable substrate having a color developer, and a marking instrument for applying the composition to the moldable substrate to form at least one mark on the moldable substrate. A method of producing a colored three-dimensional molded object includes the steps of manipulating a moldable substrate having a color developer into a molded shape having an outer surface; and applying, on the outer surface of the molded shape, a first composition having at least one color precursor to a first portion of the molded shape.

8 Claims, No Drawings

MARKING SYSTEM FOR MOLDABLE SUBSTRATES

RELATED APPLICATIONS

This application is a divisional application of U.S. application Ser. No. 16/445,959, filed 19 Jun. 2019, the disclosure of which is incorporated herein by reference in its entirety for all purposes.

FIELD OF THE INVENTION

The present invention relates generally to a marking or coloring system for moldable substrates.

BACKGROUND OF THE INVENTION

Artwork is viewed as an important developmental tool for children. For example, marking materials, such as paints and markers, are given to children for drawing, painting, and coloring purposes in order to stimulate their creativity and imagination. Of course, a significant drawback with conventional marking materials is that they tend to become very messy in use. In fact, parents often limit the use of marking materials by children because of the possibility that household objects, such as carpets and furniture, as well as skin and clothing, would be stained by the marking materials.

Marking systems have been developed that inhibit the formation of inadvertent stains on household objects or other unintended surfaces during use. For example, one commercially-available marking system, which is described in U.S. Pat. No. 6,124,377, provides a marking composition comprising at least one color precursor in the form of a leuco dye, and a substrate provided with a coating comprising at least one color-triggering developer. Upon application of the leuco dye to the substrate, a chromophore, and hence, color, is formed. Application of the leuco dye to the substrate causes the appearance of color only in the areas of the substrate that are coated with the color-triggering developer. Such a marking system is generally used with a two-dimensional coated substrate such as paper. There exists a need for a marking system that includes a moldable substrate, which can be manipulated into a three-dimensional molded shape.

SUMMARY OF THE INVENTION

It is an object of the present invention to provide a marking system that includes a moldable substrate.

It is another object to provide a method of producing a colored three-dimensional molded object.

It is another object to provide a moldable substrate suitable for use in the present invention.

One embodiment of the present invention is directed to a marking system, comprising:
  a composition comprising at least one color precursor;
  a moldable substrate comprising a color developer; and
  a marking instrument for applying the composition to the moldable substrate to form at least one colored mark on the moldable substrate.

In one embodiment, the moldable substrate comprises a modeling compound.

In another embodiment, the modeling compound comprises one or more of a modeling clay, an earth-based clay, a dough, a putty, or an elastic material.

In another embodiment, the color developer comprises a phenolic resin.

In another embodiment, the phenolic resin is a novolac resin.

In another embodiment, the moldable substrate comprises the phenolic resin in an amount of up to 50 wt %.

In another embodiment, the at least one color precursor comprises at least one of an ink or a paint.

In another embodiment, the ink or paint is oil-based or water-based.

In another embodiment, the at least one color precursor comprises a colorless leuco dye.

In another embodiment, the composition comprises at least one color precursor further comprises a scent.

The present invention is also directed to a method of producing a colored three-dimensional molded object, comprising:
  manipulating a moldable substrate comprising a color developer into a molded shape having an outer surface; and
  applying, on the outer surface of the molded shape, a first composition comprising at least one color precursor to a first portion of the molded shape.

In one embodiment, a first color mark on the first portion of the molded shape develops in response to the applied first composition.

In another embodiment, the method further comprises applying, on the outer surface of the molded shape, a second composition comprising at least one color precursor to a second portion of the molded shape, wherein the second color mark develops in response to the applied second composition.

In another embodiment, the method further comprises curing the molded shape prior to applying the first composition.

The present invention is also directed to a moldable substrate comprising a color developer configured to activate at least one color precursor to change from a first color to a second color.

In one embodiment, the moldable substrate is translucent, and wherein the activation of the at least one color precursor is visible.

In another embodiment, the moldable substrate is impregnated with the color developer.

In another embodiment, the moldable substrate is configured to be molded from a first orientation to a second orientation, wherein
  in the first orientation, a first outer surface of the molded substrate comprises a first portion of the impregnated color-developer proximate the first outer surface, and
  in the second orientation, a second outer surface of the molded substrate comprises a second portion of the impregnated color developer proximate the second outer surface.

In another embodiment, the color developer is further configured to activate the at least one color precursor to change from a first color to a third color different from the second color.

In another embodiment, the moldable substrate comprises the color developer in an amount of 50 wt % or less.

In another embodiment, the moldable substrate is one or more of a modeling clay compound, an earth clay compound, an air-drying modeling compound, a dough, a putty, or an elastic material.

DETAILED DESCRIPTION OF THE INVENTION

The embodiments described herein allow for the creation of unique 3-dimensional shapes using a modeling compound, such as Model Magic® or Air Dry Clay. Traditional painting of an object molded from a modeling composition tends to be messy. Application of the embodiments described herein to the decorating process adds a mess-free aspect to a potentially messy process. In addition, using traditional paints the user must wait until the paint is dry before handing. With the embodiments described herein, the coloration is "dry" from the instant a mark is made as it is never truly wet like a regular paint.

Provided is a moldable substrate that includes a color developer. The user can apply a composition including a color precursor to the moldable substrate, preferably with a marking instrument. In the area(s) where the color precursor and the color developer come into contact with each other, a color is developed in or on the moldable substrate.

One embodiment is a marking system, comprising:
a composition comprising at least one color precursor;
a moldable substrate comprising a color developer; and
a marking instrument for applying the composition to the moldable substrate to form at least one colored mark on the moldable substrate.

In one embodiment, the moldable substrate comprises a modeling compound. The modeling compound comprises one or more of a modeling clay, an earth-based clay, a dough, a putty, or an elastic material. The moldable substrate does not embrace paper substrates.

In another embodiment, the color developer comprises a phenolic resin and, optionally, one or more metal salts. In one embodiment the phenolic resin includes a phenol-formaldehyde polymer. As noted above, the color developer may also include metal salts, such as zinc oxide and a zinc salt of an organic acid (e.g., propionic acid or salicylic acid). In another embodiment, the phenolic resin is a novolac resin. The phenolic resin may be DUREZ 33446 or DUREZ 32420.

The color developer may be used as a component of a water-based slurry or as a solid. Such a slurry may include water, surfactants, clay, calcium carbonate fillers, and the phenolic resin (e.g., Durez 33446). The phenolic resin may react with the colorless leuco dye in an acid-base reaction converting the leuco dye to its colored form.

In this invention, a phenolic resin such as Durez 33446 is blended into a modeling compound up to 50 wt %, for example, to provide the moldable substrate. Greater amounts of the phenolic resin will increase both the intensity of the colored mark as well as the speed of color development. The modeling compound can be waterbased (e.g., Model Magic® or Air Dry Clay) or oil based (e.g., Silly Putty®). For permanent results, the modeling composition can be cured or hardened prior to application of the mark. Non-hardened modeling compounds may provide an additional effect by blending the colored markings when the compound is manipulated.

Model Magic® is described in U.S. Pat. Nos. 5,171,766; 5,364,892; 5,498,645; 5,506,280; 6,359,057, and US publication 2019/0016877, all incorporated herein by reference in their entirety. U.S. Pat. No. 10,0138,358, also incorporated by reference in its entirety, describes a substitute for PVC-based polymer clay using a formula that is related to that of Model Magic. This material may also be used in the embodiments described herein.

In one embodiment, the moldable substrate may comprise the phenolic resin in an amount of up to 50 wt %. This range includes all preferred values and subranges therebetween, including up to 45 wt %, 40 wt %, 30 wt %, 25 wt %, 20 wt %, 15 wt %, 10 wt %, 5 wt % and 1 wt %.

In another embodiment, the at least one color precursor comprises at least one of an ink or a paint. In one embodiment, the ink or paint is oil-based or water-based.

The oil-based ink may include a normally colorless leuco dye dissolved in an organic solvent. One example of a solvent system is nominally 75% by weight of soybean oil methyl esters (e.g., Soyclear® 1500) and 10% by weight of dimethyl adipate, which is an optional component. Soyclear® may be used alone as the solvent. An anti-oxidant such as Irganox® may also added to the ink. The anti-oxidant antioxidant helps prevent premature color development in the ink. Optionally, a scent may be added. The water-based ink may include water, surfactant, biocides, and a Color Wonder® "pre-mix" which contains the leuco dye dissolved in soybean oil methyl esters. The water-based paint is a thickened version of the water-based ink with corn starch and corn syrup solids as the thickening agents. The ink and paint may be applied to substrates using standard delivery methods such as an airbrush, paint brush, fingers, crayons/pencils, markers, and stampers.

In another embodiment, the at least one color precursor comprises a colorless leuco dye. The leuco dye may be brought into contact with the color developer present in the moldable substrate to develop color. The leuco dye does not develop vibrant color when applied to other, unintended surfaces in the absence of the substrate and the color developer. The colorant/dye may have no color or only minimal color in the absence of contact with a color change-inducing compound. The colorant/dye can be present in the writing compositions in any suitable amount. Preferably, the colorant is present from about 0.1% to about 8% by weight of the composition. More preferably, the colorant is present from about 0.5% and 6% by weight of the composition. Even more preferably, the colorant is present in an amount of about 0.1% by weight to about 1.5% by weight of the composition. These ranges include all specific values and subranges, such as 0.2%, 0.75%, 1%, 1.25%, 1.75%, 2%, 3%, 4%, 5% and 7%. Leuco dyes are described in U.S. Pat. No. 6,124,377 at columns 2 and 3. U.S. Pat. No. 6,124,377 is herein incorporated by reference in its entirety.

Another embodiment is a method of producing a colored three-dimensional molded object, comprising:
manipulating a moldable substrate comprising a color developer into a molded shape having an outer surface; and
applying, on the outer surface of the molded shape, a first composition comprising at least one color precursor to a first portion of the molded shape.

In one embodiment, a first color mark on the first portion of the molded shape develops in response to the applied first composition.

In another embodiment, the method further comprises applying, on the outer surface of the molded shape, a second composition comprising at least one color precursor to a second portion of the molded shape, wherein the second color mark develops in response to the applied second composition.

In another embodiment, the method further comprises curing the molded shape prior to applying the first composition. The curing may be accomplished by using procedures well-known in the art such as, e.g., by heating the molded shape.

Another embodiment is a moldable substrate comprising a color developer configured to activate at least one color precursor to change from a first color to a second color.

In one embodiment, the moldable substrate is translucent, and wherein the activation of the at least one color precursor is visible.

In another embodiment, the moldable substrate is impregnated with the color developer.

In another embodiment, the moldable substrate is configured to be molded from a first orientation to a second orientation, where in the first orientation, a first outer surface of the molded substrate comprises a first portion of the impregnated color-developer proximate the first outer surface, and in the second orientation, a second outer surface of the molded substrate comprises a second portion of the impregnated color developer proximate the second outer surface.

In another embodiment, the color developer is further configured to activate the at least one color precursor to change from a first color to a third color different from the second color.

The composition containing the color precursor may be applied to the moldable substrate with the marking instrument. The marking instrument may be an airbrush, paint brush, finger, crayons/pencil, marker, or a stamper. In such embodiments, the composition may be formed into different shapes, including into pencil core shapes, crayon shapes, or mechanical pencil core shapes by a variety of processes; that is, the compositions are versatile with respect to their processing capability. For example, the compositions may be injection molded, hot-melt extruded, or ram extruded into pencil cores or crayon stick shapes. The compositions may be formed into any shape suitable for a writing instrument via injection molding and/or extrusion. Despite the differences in these processing techniques, the compositions according to embodiments of the invention herein are generally suitable for either process and produce writing instruments having the same desirable properties.

Crayons, pencil cores and/or pencils produced from the compositions according to embodiments of the invention herein may be covered or wrapped in supportive sheaths or coatings. The sheaths may be made of wood or plastic. Alternatively, or in addition to a sheath, a coating layer of thermoplastic material (e.g., HDPE) may be applied to the outside of pencil cores and/or pencils produced from the compositions according to the invention herein.

In some embodiments, the compositions of the present invention may include optional additives. These additives may include, but are not limited to, dispersing agents, thermal stabilizers, scents, glitter, lubricants, plasticizers, preservatives, and antioxidants.

In particular embodiments, the compositions of the present invention may include between about 0.1% and about 25% by weight of additive(s). This range includes all specific values and subranges, such as 0.1%, 0.5%, 1%, 2%, 5%, 10%, 15% and 20% by weight.

EXAMPLES

The following Examples illustrate specific embodiments of the invention and are not intended to be limiting in any way.

Example 1 Air-Dry Clay

Formulation

| Ingredient | wt % |
|---|---|
| water | 14.7 |
| sorbitol | 6.5 |
| Reputain B30 | 0.2 |
| Fungitrol 940 | 0.2 |
| Kaolin | 63.3 |
| Tektamer 38AD | 0.1 |
| Durez 33446 | 15.0 |
| Total | 100.0 |

Example 2 Model Magic®

Formulation

| Ingredient | wt % |
|---|---|
| Water | 23.09 |
| Ammonium pentaborate tetrahydrate | 0.46 |
| Triethanolamine 75% aqeuous solution | 1.12 |
| Propylene glycol | 5.77 |
| Mineral oil | 0.77 |
| Potato Starch | 15.77 |
| Dualite Microspheres | 19.61 |
| T-Clay | 2.5 |
| Glycerine | 5.09 |
| Foamex 825 | 0.26 |
| Hydropalat 44 | 0.51 |
| Polyvinyl alcohol | 3.56 |
| Propylene Glycol | 5.38 |
| Reputain B30 | 0.18 |
| Fungitrol 940 | 0.25 |
| Reputain K50 | 0.13 |
| Phosphoric Acid (62%) | 0.23 |
| Durez 3346 | 15.27 |
| Tektamer 38AD | 0.06 |
| Total | 100.00 |

Tradename Descriptions

Foamex 825 (defoamer) —polydimethylsiloxane emulsion

Hydropalat 44 (dispersant) —sodium polyacrylate solution

Reputain B30 (preservative) —2-bromo-2-nitro-1,3-propanediol solution

Fungitrol 940 (preservative) —3-iodo-2-propynyl butylcarbamate solution

Reputain K50 (preservative) —glutaraldehyde solution

Tektamer 38AD (preservative) —1,2-dibromo-2,4-dicyanobutane solution

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of producing a colored three-dimensional molded object, comprising:
   manipulating a moldable substrate comprising a color developer and a modeling compound into a molded shape having an outer surface; and
   applying, on the outer surface of the molded shape, a first composition comprising at least one color precursor to a first portion of the molded shape,
   wherein the modeling compound comprises one or more of a modeling clay, an earth-based clay, a dough, a putty, or an elastic material.

2. The method of claim 1, wherein a first color mark on the first portion of the molded shape develops in response to the applied first composition.

3. The method of claim 2, further comprising applying, on the outer surface of the molded shape, a second composition comprising at least one color precursor to a second portion of the molded shape, wherein the second color mark develops in response to the applied second composition.

4. The method of claim 1, further comprising curing the molded shape prior to applying the first composition.

5. A method of producing a colored three-dimensional molded object, comprising:
   manipulating a moldable substrate comprising a color developer into a molded shape having an outer surface;
   hardening the molded shape by drying the molded shape, followed by applying, on the outer surface of the molded shape, a first composition comprising at least one color precursor to a first portion of the molded shape,
   wherein the moldable substrate is impregnated with the color developer.

6. The method of claim 5, wherein a first color mark on the first portion of the molded shape develops in response to the applied first composition.

7. The method of claim 6, further comprising applying, on the outer surface of the molded shape, a second composition comprising at least one color precursor to a second portion of the molded shape, wherein the second color mark develops in response to the applied second composition.

8. The method of claim 5, further comprising curing the molded shape prior to applying the first composition.

* * * * *